United States Patent
Halonen

(10) Patent No.: US 11,470,992 B2
(45) Date of Patent: Oct. 18, 2022

(54) COFFEE BREWER

(71) Applicant: Ari Halonen, Maura (NO)

(72) Inventor: Ari Halonen, Maura (NO)

(*) Notice: Subject to any disclaimer, the term of this patent is extended or adjusted under 35 U.S.C. 154(b) by 552 days.

(21) Appl. No.: 16/469,996

(22) PCT Filed: Dec. 15, 2017

(86) PCT No.: PCT/NO2017/050330
§ 371 (c)(1),
(2) Date: Jun. 14, 2019

(87) PCT Pub. No.: WO2018/111119
PCT Pub. Date: Jun. 21, 2018

(65) Prior Publication Data
US 2020/0085226 A1    Mar. 19, 2020

(30) Foreign Application Priority Data

Dec. 15, 2016    (NO) .................................. 20161995

(51) Int. Cl.
*A47J 31/06*    (2006.01)
*A47J 31/14*    (2006.01)
(Continued)

(52) U.S. Cl.
CPC ............. *A47J 31/14* (2013.01); *A47J 31/005* (2013.01); *A47J 31/0626* (2013.01); *A47J 31/0636* (2013.01); *A47J 31/18* (2013.01)

(58) Field of Classification Search
CPC ...... A47J 31/005; A47J 31/06; A47J 31/0636; A47J 31/14; A47J 31/0626
(Continued)

(56) References Cited

U.S. PATENT DOCUMENTS 6,164,495 A * 12/2000 Manesis ................ A61F 9/0008
222/129
6,945,393 B2 * 9/2005 Cho ........................ B65D 51/24
206/219

(Continued)

FOREIGN PATENT DOCUMENTS

EP        1 260 165      11/2002
WO      2016/014570      1/2016

OTHER PUBLICATIONS

International Search Report dated Mar. 12, 2018 in corresponding International Application No. PCT/NO2017/050330.
(Continued)

*Primary Examiner* — Reginald Alexander
(74) *Attorney, Agent, or Firm* — Wenderoth, Lind & Ponack, L.L.P.

(57) ABSTRACT

A coffee brewer and a method of brewing coffee or another beverage with hot liquid, including tea, are provided. The coffee brewer includes a container with an inner volume, a closed end and an open end. A lid includes an inside with an inner area and an outside, for sealing attachment to the open end. An outlet and a valve, are configured to open or close a flow path between the container and the outlet. A coffee filter is secured to the inside of the lid, in the flow path between the container and the outlet. The outlet is configured to allow pouring of coffee while actuating the valve, and the valve can be actuated from a closed position to an open position with the closed end of the container facing up and the container being above the lid, without spilling coffee on an operator of the valve.

11 Claims, 4 Drawing Sheets

(51) Int. Cl.
*A47J 31/00* (2006.01)
*A47J 31/18* (2006.01)

(58) Field of Classification Search
USPC .................................................. 99/322, 323
See application file for complete search history.

(56) References Cited

U.S. PATENT DOCUMENTS

| | | | |
|---|---|---|---|
| 8,464,633 B2* | 6/2013 | Anson | ..................... C02F 1/002 |
| | | | 99/323 |
| 9,801,492 B1* | 10/2017 | Lin | ......................... A47J 31/20 |
| 2002/0166453 A1 | 11/2002 | Jensen et al. | |
| 2004/0020368 A1 | 2/2004 | Cai | |
| 2012/0074143 A1* | 3/2012 | Lin | ..................... A47J 41/0027 |
| | | | 220/259.4 |
| 2013/0101715 A1 | 4/2013 | Geissler et al. | |
| 2014/0174965 A1 | 6/2014 | Herling et al. | |

OTHER PUBLICATIONS

Norwegian Search Report dated Jun. 22, 2017 in corresponding Norwegian Application No. 20161995.
International Preliminary Report on Patentability dated Mar. 26, 2019 in corresponding International Application No. PCT/NO2017/050330.

* cited by examiner

COFFEE BREWER

BACKGROUND OF THE INVENTION

1. Field of the Invention

The present invention concerns a coffee brewer for brewing in particular fresh coffee without supply of energy beyond the requirement for hot water. The coffee brewer preferably includes an insulated container with a sealing lid, a filter and an outlet valve.

2. Description of the Related Art

To achieve a properly brewed coffee, tea or other types of warm beverage that must be brewed/infused it is of relevance that the beverage is brewed from fresh raw materials. Within coffee societies, will the person drinking the coffee taste the difference between freshly brewed coffee as opposed to old coffee or instant coffee.

There are different known devices for preparing freshly brewed coffee, such as cappuccino machines and French press devices. The taste and aroma of the coffee is also influenced by how the coffee beans are treated before grinding (including roasting), and also the type of grinding the beans are exposed to that affects the time required for brewing or infusion.

These concerns must be evaluated when brewing fresh coffee and transport of ready-made coffee on for instance a vacuum flask results in a reduced or lost freshly brewed aroma. In an automatic drip filtration machine, hot water flows through ground coffee and through a coffee filter before the coffee in consummated. Making coffee in this way requires electric energy to power the machine, making it difficult to prepare freshly brewed coffee without access to electric power.

It is thus a need for an apparatus for preparing freshly brewed coffee where the apparatus is independent of external sources of energy such as electricity.

SUMMARY OF THE INVENTION

The present invention concerns a coffee brewer for full-immersion brewing, including a container with a volume, a closed end and an open end. A lid includes an inside with an inner area and an outside with for sealing attachment to the open end. An outlet and a manually actuated sealed valve, open or close a flow path between the container and the outlet. A coffee filter is secured to the inside of the lid, in the flow path between the container and the outlet. The outlet is located to allow pouring of coffee while actuating the valve, whereby the valve of the coffee brewer can be actuated from a closed position to an open position with the closed end facing up and the container above the lid, without spilling coffee on an operator actuating the valve.

The container may be insulated.

The valve may be formed with a valve seat surrounding a channel in the lid and a screw-cap with outlets may be surrounded by a gripping surface.

The outlets may be surrounded by a sleeve protruding as a cylindrical ring from a front portion of the end-cap whereby spillage of coffee onto a hand of an operator when unscrewing the screw cap is prevented.

The outlets at the front portion of the end-cap are distributed as a plurality individual outlets, whereby the end-cap attenuates the flow of coffee to prevent jets of coffee from the end-cap.

The outlets at the front portion of the end-cap may form discrete arc-shaped openings, and the arcs form a complete circle surrounding a front face of the end-cap.

The end-cap includes a centrally located cylindrical portion holding an O-ring, and a cylindrical portion with internal threads.

The coffee brewer may further include a gap between the inner lid surface and a circular, perforated filter holder, forming a cavity, and wherein the flow path extend through this cavity and a coffee channel in the lid.

The lid may include an inner surface at the inside of the filter holder seat allowing coffee to flow towards a channel at the middle the lid at a cylindrical protrusion on the lid.

The filter holder seat may secure and seal the filter holder to the lid along a periphery of the filter holder.

The filter may be shaped as a flat circular disc.

Furthermore, the invention relates to a method of brewing coffee with a coffee brewer including a container with a volume, a closed end and an open end, a lid with an inside with an inner area and an outside with for sealing attachment to the open end, an outlet and a manually actuated sealed valve, opening or closing a flow path between the container and the outlet, and a coffee filter secured to the inside of the lid, in the flow path flow path between the container and the outlet. The outlet may be located to allow pouring of coffee while actuating the valve. The method includes filling up to 60% of the container, with hot water, adding ground coffee to the hot water, closing the open end of the container with the lid, turn the coffee brewer to allow the closed end to face up and the lid to face down, hold the brewer above a cup or other suitable container while keeping the lid facing down; and opening the valve while allowing the heated air inside the brewer to press the coffee through the filter in the lid and into the cup or the other suitable container without spilling coffee on an operator actuating the valve.

Alternatively, the manual valve may be a ball valve or a seat valve.

The filter may typically span over substantially the entire inner area of the lid.

The coffee filter may be a disposable filter, a reusable metal filter, a reusable cloth/fabric filter or a reusable synthetic filter.

DETAILED DESCRIPTION OF THE INVENTION

Figure 1:
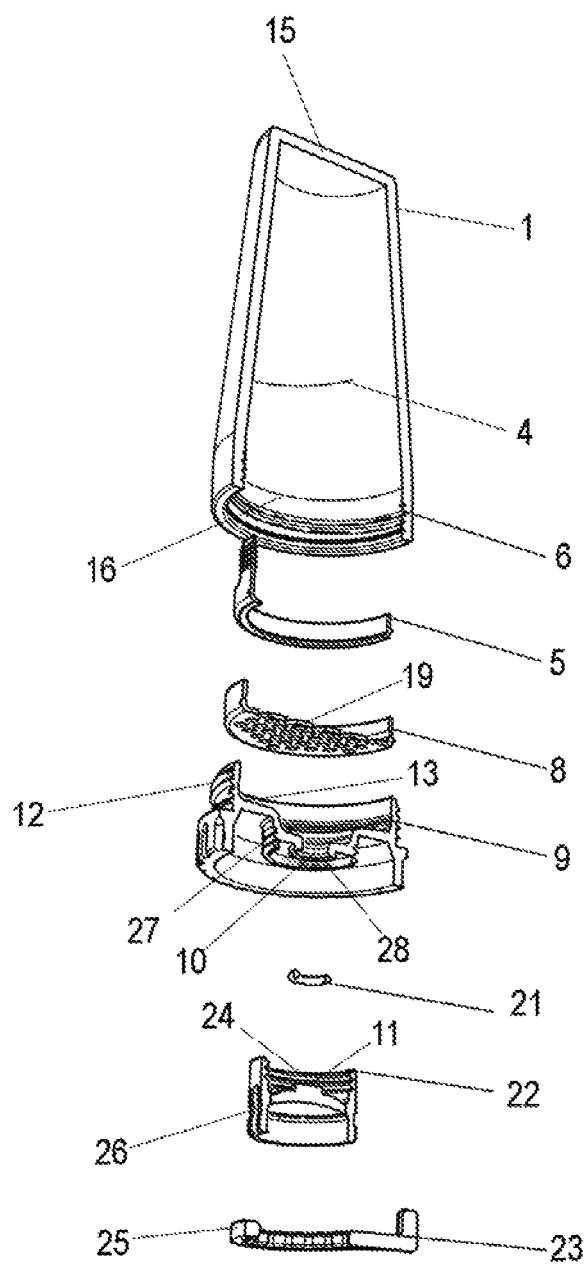
FIG. 1 is an exploded view in cross section of a coffee brewer according to the invention.

FIG. 1 is an exploded view in cross section of a coffee brewer according to the invention. The coffee brewer includes an insulated cup/container 1. The container defines an inner volume to be filled with ground coffee, hot/near boiling water up to mark 4 and air. The container has a closed end 15 and an open end 16 closed with a lid 9. The lid 9 has an inner portion with an inner area and an outside for air tight attachment in the open end. The lid 9 has outside/male threads 12 extending into inner/female threads 6 in the container 1. In an alternative embodiment ate these threads substituted with a bayonet coupling, and the threads 6, 12 are then substituted with elements in locking engagement with another. Other ways of attaching the lid 9 includes two over the center locks or one over the center lock and one hinge (not shown).

A screw cap coffee diffuser 22 with outlets includes an O-ring seal 21 surrounding a central cylindrical protrusion holding the O-ring 21 in place on an inner surface of the screw cap 22. Inner threads 24 in the screw cap 22 are in mating contact with outer threads 27 on a cylindrical protrusion on the lid 9. A coffee channel 10 extends through the lid at the cylindrical protrusion on the lid 9. The cylindrical protrusion on the lid 9 also includes an annular valve seat 28 or sealing surface for contact with the valve O-ring 21 on the screw cap 22. The diameter of the valve O-ring 21 corresponds to the diameter of the annular valve seat 28. The outlets on the diffuser are located as cut outs/openings along a diameter inside of the outer periphery on a front portion of the screw cap. The inner surface of the end-cap with a central cylindrical protrusion holding the O-ring in place is formed by the inside of the front portion. The openings are arc-shaped, and the arcs form a complete surface. The arc-shaped outlets and the design of the end-cap diffuser ensures that the pressure inside the coffee brewer not results in a jet of hot coffee out of the brewer.

The Valve O-ring 21 and the O-ring seat 28 forms a valve, maintaining pressure inside the brewer until the end-cap 22 diffuser is partly unscrewed, unseating the Valve O-ring 21 from the O-ring seat 28, thus allowing coffee to be expelled past the valve O-ring 21, past a cavity formed between a front portion of the cylindrical protrusion of the lid and the inner surface of the end-cap, and out of the arc-shaped openings at the front part of the screw cap 22.

A handle 23 on a fluted grip ring 25 can be installed around the screw cap 22 to facilitate twisting and opening of the screw cap 22. Grooves 26 on the end-cap 22 increases friction when gripping the screw cap 22. The grooves 26 also serve to lock the grip ring 25 in place on the screw cap 22.

The mark 4 inside the container 1 is typically located to divide the volume inside the container to allow 60% water and 40% air inside the container. (leaving 60% of the volume towards the closed end 15, to allow the pouring of boiling water into 60% of the container 1, leaving 40% room for air/steam from the boiling water towards the open end 16). The ratio of water to air could be in the range 50 to 60% water, but it is essential that the container not is filled with more that 60% water to enable the air pressure in the container to expel the coffee through the filter.

A base 37 surround the lid 9, leaving and an end of the end-cap 22 extending beyond the base to ease twisting of the end-cap 22 to open the valve.

Figure 2:
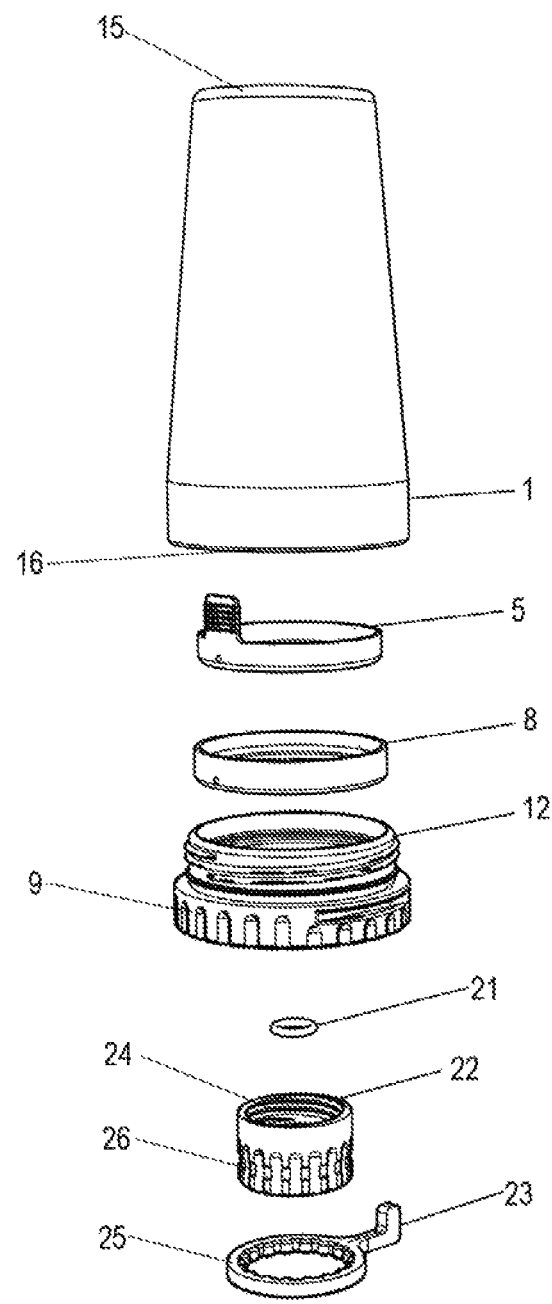
FIG. 2 shows the coffee brewer of FIG. 1 in an exploded vies from the outside, at a slightly different angle compared to FIG. 1.

FIG. 2 shows the coffee brewer of FIG. 1 from the outside, at a slightly different angle compared to FIG. 1. The container 1 with the closed end 15 and the open end 16 in an insulated container to reduce heat loss thorough the container when the coffee is brewing and to prevent burning the hands of an operator when handling the coffee brewer. The container 1 should also have a low specific heat capacity to reduce heat loss from the coffee. The volume of the container is typically sufficient to brew one or two cups of coffee.

The heat loss in the coffee should be low to ensure that the air (and some steam) inside the brewer is heated and expands to provide an above atmospheric pressure inside the coffee brewer, and to ensure that the beverage/coffee is hot when it is served.

The removable locking ring 5 holds a filter (not shown) to the perforated filter holder 8. A snap lock, magnets, threads, a bayonet coupling or any other suitable means hold the removable locking ring 5 to the perforated filter holder 8 while holding the filter in place.

The outer threads 12 hold the lid 9 to the container 1 and close the open end 16 of the container 1. A lid sealing O-ring in a groove surrounding the lid 9, seals against the container 1. The valve O-ring 21 could be any type of suitable seal not requiring a high surface pressure while keeping its properties at temperatures at around 100° C. The inner threads 24 in the end-cap 22 may have a thread pitch adapted to allow the valve O-ring 21 to be sufficiently unseated from the O-ring seat on the lid 9 to allow coffee to be expelled from the coffee brewer upon turning the end-cap approximately a quarter of a turn to be able open the valve and to pour coffee without repositioning the hand.

Figure 3:
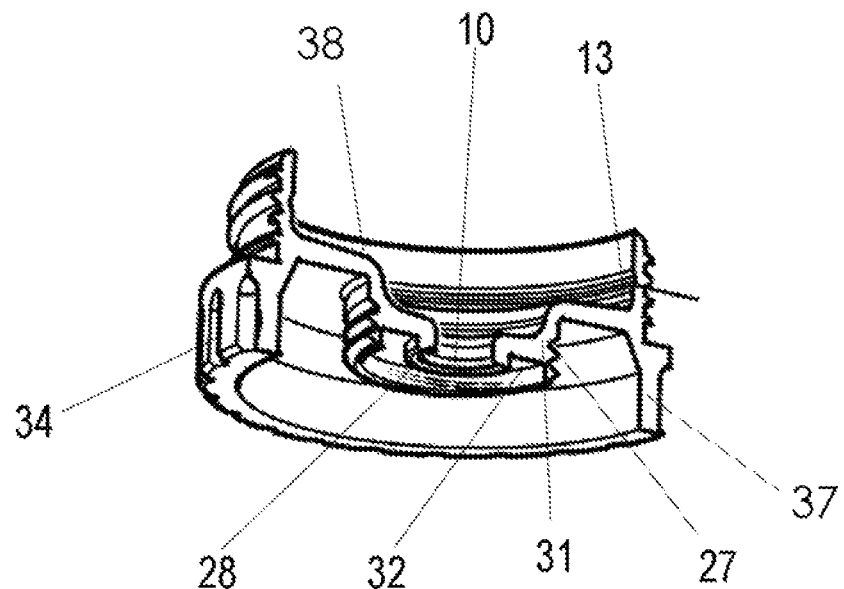
FIG. 3 is a perspective view in detail of a cross section of the lid.
Figure 4:
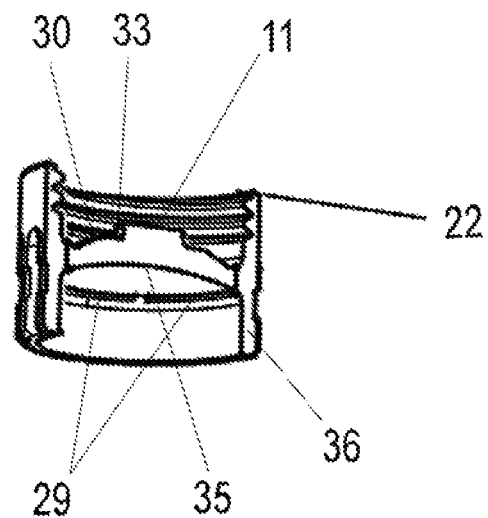
FIG. 4 is a perspective view in detail of a cross section of the screw-cap.

FIGS. 3 and 4 show details of the lid and screw cap.

FIG. 3 shows the lid with an external fluted gripping surface 34 to facilitate screwing and unscrewing the lid 9 to and from the container. The fluted surface is located on an outer surface of the base 37, formed as a cylindrical ring at the periphery of the lid. End-cap 22 form the lowermost extremity of the brewer, allowing the valve to be safely opened as the valve is easy to grab beneath the base 37. The lid includes an inner surface 38 inside of the filter holder seat 13 allowing coffee to flow towards the channel 10 at the middle the lid at the cylindrical protrusion 31 on the lid. Outer threads 27 surrounding the cylindrical protrusion 31 on the lid gripping into inner threads 24 in the screw cap 22 (FIG. 4) allows the two parts to be joined.

A seating surface 28 surrounding the channel 10 seal against the O-ring (shown in FIG. 1) located in an O-ring seat 33 on the inner surface of the end-cap 22 (FIG. 4) with the central cylindrical protrusion 11 holding the O-ring in place is formed by the inside/inner surface 30 of the front portion 35.

FIG. 4 shows the outlets 29 located as cut outs/openings in the front portion 35 along a diameter inside of the outer periphery on a front portion 35 of the screw cap 22. The outlets 29 are surrounded by a sleeve 36 protruding as a cylindrical ring from the front portion 35 to prevent spillage of coffee onto a hand of an operator when unscrewing the screw cap 22 while holding the coffee brewer in the position for opening the brewer, i.e. in a position with the screw cap 22 facing down as shown in FIG. 1.

In an alternative embodiment the O-ring seal is located on the lid and the O-ring seat is located on the screw cap.

The O-ring seat 33 includes a suitable O-ring groove to hold the O-ring in place.

The inner surface of the end-cap with a central cylindrical protrusion holding the O-ring in place is The Valve O-ring 21 and the O-ring seat 28 forms a valve, maintaining pressure inside the brewer until the end-cap 22 diffuser is partly unscrewed, unseating the Valve O-ring 21 from the O-ring seat 28, thus allowing coffee to be expelled past the Valve O-ring 21, past a cavity formed between a front portion of the cylindrical protrusion of the lid and the inner surface of the end-cap, and out of the arc-shaped openings at the front part of the screw cap 22.

Figure 5A:
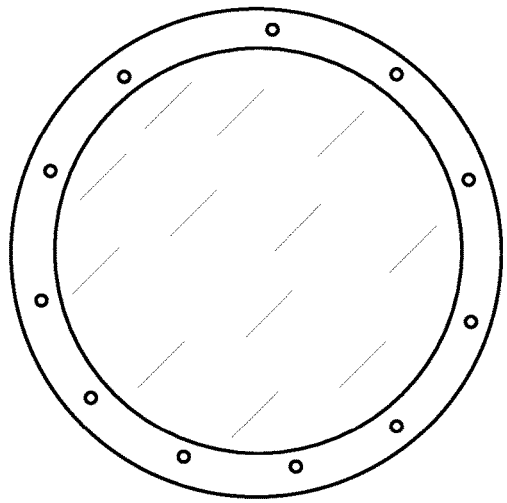
FIGS. 5a, 5b, 5c and 5d show various types of filters that may be used in connection with the invention.
Figure 5B:
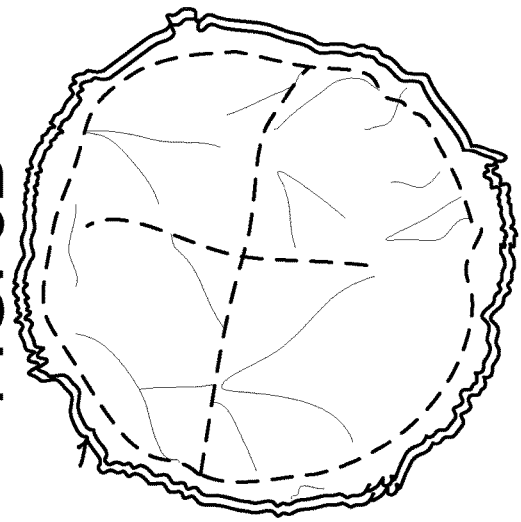
Figure 5C:
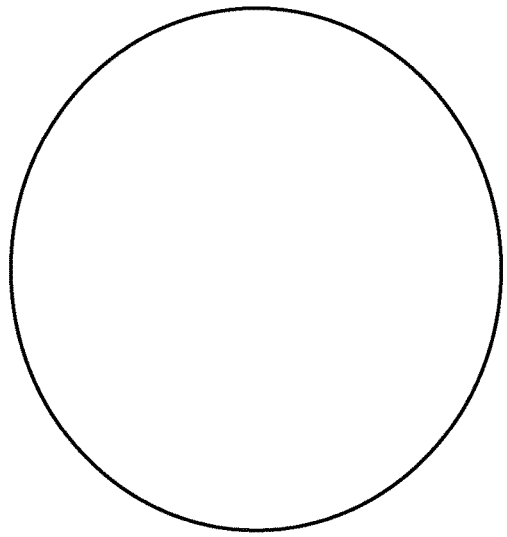
Figure 5D:
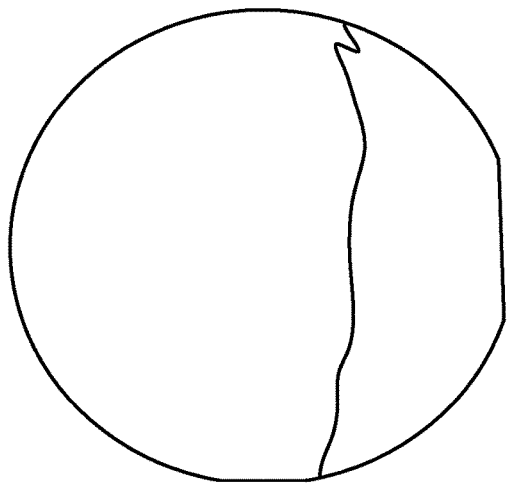

FIGS. 5*a*-5*d* show various coffee filters that may be used in the coffee brewer of the invention. FIG. 5*a* show a disposable paper filter, FIG. 5*b* show a reusable metal filter, FIG. 5*c* shows a reusable synthetic mesh filter and FIG. 5*d* shows a reusable woven cloth/fabric filter. Other types of filters such as perforated metal plate filter and various types of synthetic fiber filters may also be used.

Different filters may be chosen based on preference, how finely the coffee beans are ground etc.

Freshly brewed coffee is made using the apparatus according to the invention by providing an amount of coffee into the container through the open end of the container (without the lid). The amount and type of coffee is decided out of need, desire and experience. The amount used can be calculated from the strength that is desired based on the amount of water that is added to the container. For best effect, of the brewer, the container is filled with 60% or less water (of the total inner volume of the container when the lid is installed), for instance 50% of the container volume with hot/boiling water (60-100° C.). The amount of water that is added is accordingly a proportion below 60% of the total inner volume of the brewer. The water can be heated in advance, and hot water from a vacuum flask may be sufficient.

The difference between using the brewer of the invention compared to transporting ready-made coffee on a vacuum flask is that the brewer of the invention allows consummation of freshly brewed coffee in situ.

Coffee on a vacuum flask is over time oxidized due to reaction with air and the aroma of the coffee gradually deteriorates.

It is clearly also possible to heat the water in situ over open fire etc.

When the water and ground coffee has been added to the container, the container is closed with the lid with the valve closed. The brewer is now sealed. The air and steam above the coffee will then expand and the pressure inside the brewer will increase. The increase of pressure is depending on the temperature difference between the ambient temperature and the air inside the brewer.

As an example, one can assume that the temperature difference between the ambient air and inside the brewer is 80° C. This will result in an increase of pressure. This increase of pressure is used during the brewing/infusion to pull the aroma out of the ground coffee. This may be done by turning the brewer to a position with the lid down when the ground coffee and hot water is poured into the container, the valve is closed and the lid is in place on the container.

The coffee grounds will accumulate towards the inside of the lid. As the brewer is turned with the lid down, it is an advantage that the pressure inside the brewer will press the brewed coffee through the coffee grounds, through the filter, through the valve, through the diffuser and into a cup. As the valve is opened and the coffee is poured with the lid and valve pointing down, the pressure is utilized to press the liquid/coffee out of the brewer rather than air out of the valve.

The filter at the inside of the lid prevent the coffee grounds from being entrained with the coffee when the valve is opened while keeping the valve pointing down.

The container typically has a volume of 0.4-1.2 liters. Insulated containers of this type are common in connection with thermos cups and thermos flasks. Thermo-cups and flasks of this size are easy to handle and pour from.

In this discussion the term coffee brewer is used as a term to name the invention, because brewing coffee is considered to be the most obvious and important use of the brewer. The brewer can however be used to brew other types of beverages brewed from a warm liquid and a substance that has to be filtered away. The invention may for instance also be used to brew tea from tea leaves.

It should be noted that the closed end 15 can include an additional lid, and the claims are not intended to exclude a version with an additional lid at the closed end. In this embodiment, the method will not need the step of turning the brewer as the brewer in this embodiment is filled with coffee from the closed end with the lid, and the bottom lid is removed for removing coffee grounds.

The invention claimed is:

1. A coffee brewer including:
   a container with an inner volume, a closed end and an open end;
   a lid with an inside having an inner area and an outside, for sealing attachment to the open end of the container;
   an outlet and a manually actuated sealed valve in the lid, for opening or closing a flow path between the container and the outlet; and
   a coffee filter secured to the inside of the lid, in the flow path between the container and the outlet,
   wherein:
   the manually actuated sealed valve is formed with a screw-cap with the outlet surrounded by a gripping surface, whereby the outlet is configured to allow pouring of coffee while actuating the manually actuated sealed valve, and whereby the manually actuated sealed valve can be actuated from a closed position to an open position with the closed end of the container facing up and the container being above the lid, without spilling the coffee on an operator of the manually actuated sealed valve; and
   the lid includes an inner surface inside of a coffee filter holder seat for allowing the coffee to flow towards a channel at a middle of the lid at a cylindrical protrusion on the lid.

2. The coffee brewer of claim 1, wherein the container is insulated.

3. The coffee brewer of claim 1, wherein the manually actuated sealed valve is formed with a valve seat surrounding the channel in the lid.

4. The coffee brewer of claim 1, wherein the outlet is one of a plurality of outlets surrounded by a sleeve protruding as a cylindrical ring from a front portion of the screw-cap for preventing spillage of the coffee onto a hand of the operator when the screw-cap is unscrewed.

5. The coffee brewer of claim 1, wherein the outlet is one of a plurality of outlets at a front portion of the screw-cap, and the screw-cap is configured to attenuate a flow of the coffee to prevent jets of the coffee from the screw-cap.

6. The coffee brewer of claim 5, wherein the plurality of outlets form respective arc-shaped openings and respective arcs of the arc-shaped openings together form a complete circle surrounding a front face of the screw-cap.

7. The coffee brewer of claim 3, wherein the screw-cap includes a centrally located cylindrical portion holding an O-ring, and a cylindrical portion with internal threads.

8. The coffee brewer of claim 1, further including a gap between the inner surface of the lid and a circular, perforated coffee filter holder, forming a cavity, wherein the flow path extends through the cavity and the channel in the lid.

9. The coffee brewer of claim 1, wherein the coffee filter holder seat is configured to secure and seal a coffee filter holder to the lid along a periphery of the coffee filter holder.

10. The coffee brewer of claim 1, wherein the coffee filter is shaped as a flat circular disc.

11. A method for brewing coffee with the coffee brewer of claim 1, the method including:
    filling up to 60% of the container with hot water;
    adding ground coffee to the hot water;

closing the open end of the container with the lid;
turning the coffee brewer to allow the closed end of the container to face up and the lid to face down to locate the container above the lid;
holding the coffee brewer above a cup or other container while keeping the lid facing down; and
opening the manually actuated sealed valve while allowing heated air inside the coffee brewer to press the coffee through the coffee filter in the lid and into the cup or other container without spilling the coffee on the operator of the manually actuated sealed valve.

\* \* \* \* \*